United States Patent Office 2,782,108
Patented Feb. 19, 1957

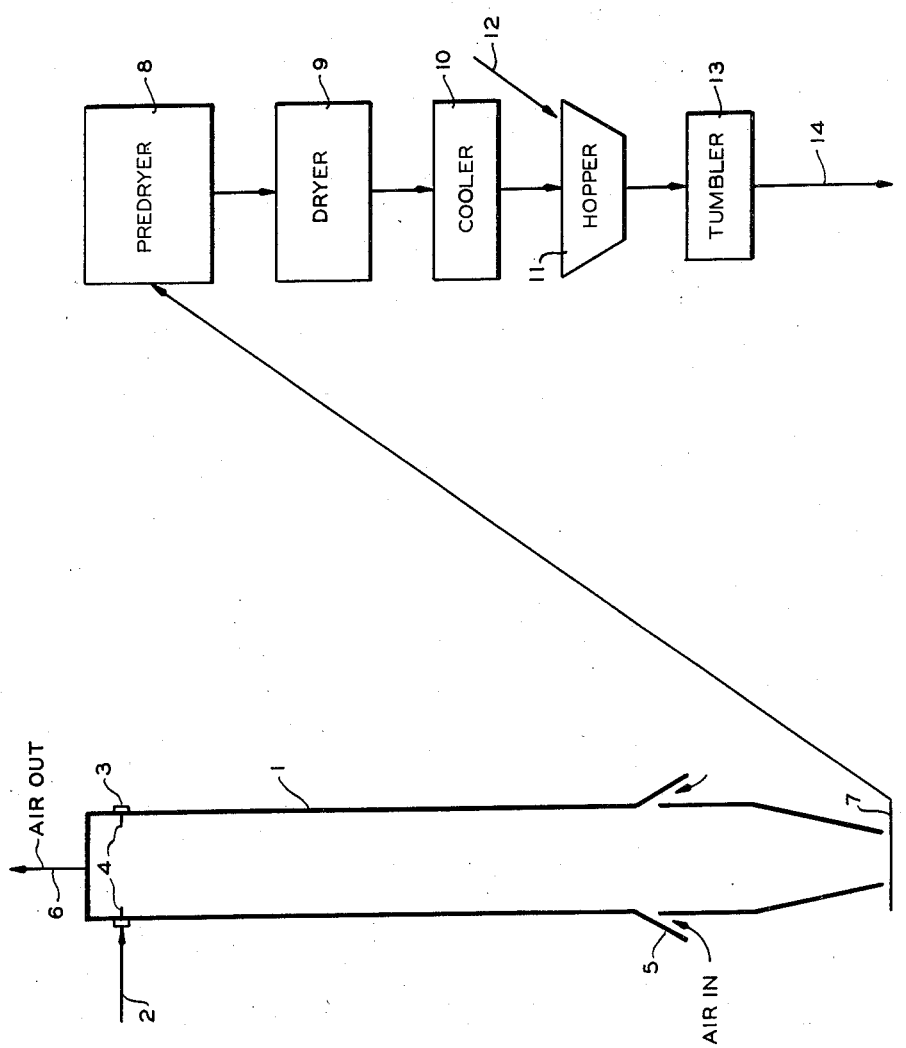

2,782,108

PRODUCTION OF CRYSTALLINE AMMONIUM NITRATE

Herbert R. Antle, Dumas, Tex., assignor to Phillips Petroleum Company, a corporation of Delaware Application September 18, 1953, Serial No. 380,979

8 Claims. (Cl. 23—302)

This invention relates to the production of crystalline ammonium nitrate prills. In one of its aspects, this invention relates to the formation of ammonium nitrate prills at a temperature higher than the monoclinic critical crystalline temperature of 84.2° C. In another of its aspects, this invention relates to the production of prilled ammonium nitrate which is non-caking, characterized by a pearly, lustrous, uniform and round surface, is extremely hard, relatively easily dried, and has excellent resistance to moisture pickup.

Ammonium nitrate is an excellent source of nitrogen in fertilizer. However, ammonium nitrate produced by crystallization is very hygroscopic and tends to cake or coagulate which makes such material difficult to use. In order to overcome some of these difficulties associated with crystallized ammonium nitrate, a method of forming prills has long been used. These prills are solidified droplets of ammonium nitrate crystals formed by spraying a molten 94+ percent ammonium nitrate containing 4 to 6 percent moisture into a tower where the droplets are solidified by cooling as said droplets fall in the tower countercurrent to an ascending cooling gas (generally air).

A typical ammonium nitrate prill manufacturing process will comprise feeding ammonia and nitric acid to a neutralization zone wherein the ammonia and acid react to form ammonium nitrate in solution. The solution is then concentrated in a concentration zone to 94+ percent ammonium nitrate by removal of water. This concentrate is heated, if necessary, to a temperature above the fudge point of the concentrate, as hereinafter defined, and the said concentrate is then sprayed into a prilling zone. In the operation of such a prilling process, it has been the belief that the prills should be cooled to a temperature less than the monoclinic critical temperature (84.2° C.) of the ammonium nitrate while falling in the tower. As used herein and in the appended claims, the term prilling temperature refers to the temperature to which the falling droplets are cooled during the fall in the tower and is measured by the temperature of the prills in the bottom of said tower.

When a molten ammonium nitrate concentrate is cooled from a molten state to room temperature by removing heat at a constant rate, a temperature is reached where the rate of cooling (rate of temperature drop) experiences an inflection point (that is the rate of cooling decrease) but does not solidify. This temperature is known as the fudge point and is dependent upon the amount of water present in the concentrate. As further heat is removed, a second inflection is encountered where the concentrate will solidify. Sometimes, depending upon the concentration, the two said inflection points will coincide, this point of coincidence is known as a triple point where cubic, tetragonal and liquid phase are in equilibrium. Three such inflection points will be encountered in cooling from liquid to below 84.2° C. The temperatures at which these inflection points are encountered are due to the crystalline structure within the solid ammonium nitrate changing form. As ammonium nitrate cools from the molten state to room temperature, it passes through four crystalline phases which are usually named by roman numerals such as phase I, phase II, phase III and phase IV. These phases are generally considered to correspond to the cubic, tetragonal, monoclinic, and rhombic crystalline forms respectively. At 84.2° C., the ammonium nitrate changes from phase II to phase III and this temperature is referred to herein as the monoclinic critical temperature.

Heretofore, when a prilling temperature higher than the monoclinic critical temperature has been used, it has been for the purpose of obtaining hollow prills or spheres. This latter product is particularly adapted to the explosives industry, but these prills are too fragile to be of much value as a fertilizer ingredient. Prills for fertilizer use should be hard and dense so as not to break up during packaging and processing, they should not be so large as to be heavily concentrated particles in the fertilizer compound, and should not contain so many fines as to be too rapidly leached by precipitation. Fines are also more hygroscopic than are the larger prills.

I have found that a solid spherical material can be produced by prilling ammonium nitrate at a temperature somewhat above the monoclinic critical temperature and that these prills will be superior to the prills heretofore produced. That is, the material will be relatively non-hygroscopic, free flowing, non-caking, relatively dense, hard and tough.

An object of this invention is to provide a method of producing an improved ammonium nitrate fertilizer. A more specific object of this invention is to provide a means of producing a prilled ammonium nitrate which is relatively non-caking, free flowing, non-hygroscopic, hard, easily dried and which is characterized by a pearly, lustrous, uniform and spherical surface.

Those skilled in the art, having been given this disclosure, will readily see many modifications which can be made in my process without departing from the scope of this invention.

In the operation of my invention, the ammonium nitrate is removed from a concentration zone at a moisture content less than 6 percent and generally in the range between 2.8 and 5 percent and preferably between 4 and 5 percent and at a temperature above the fudge point and usually in the range between 130 and 150° C. (preferably between 140 and 145° C.) and is sprayed into the top of a prilling zone where small droplets are formed. These droplets are solidified or frozen as they fall countercurrent to an ascending cooling medium, usually air. As the droplets continue to fall, they are cooled to between 84.2 and 100° C. and preferably to between 87 and 93° C. Prills formed by this method, instead of being hollow or being fragile or cracked as a result of going through the inversion temperature of 84.2° C. upon further cooling as would be expected, are relatively dense, hard and tough. These solidified prills are conveyed from the bottom of the prilling tower to a pre-drier and then to a final drier where the moisture content is lowered to less than 1.0 percent and preferably to less than 0.5 percent. The prills are then cooled and mixed with a parting agent such as clay after which they are conveyed to storage or to a bagging machine.

I will further describe my invention by referring to the attached drawing. However, it should be understood that my invention is not limited to any particular equipment and the figure is illustrative only.

The drawing is a schematic flow diagram showing how the process of my invention can be utilized.

Now referring to the drawing, molten 99+ percent ammonium nitrate at a temperature above its fudge point, usually in the temperature range between 130 and 150° C. and preferably in the range between 140 and 145° C., is sprayed into the top of a prilling zone 1 via conduit 2, doughnut ring 3 and spraying means 4. The spraying means, spray nozzles, can be directed from a position only a few degrees from the vertical to horizontal and can be directed either upward or downward. The molten ammonium nitrate is broken up into small droplets as a result of the spraying action. These droplets solidify into small spherical solid prills as they fall countercurrent to a rising stream of air. The air enters the prilling zone through louvers 5 and is withdrawn through vent 6. The air causes the molten ammonium nitrate to solidify or crystallize and cools the solid prills to 84.2–100° C. and preferably to between 87 and 93° C. The rate of air flow or the temperature of the air or both are so controlled that the temperature of the prills as they reach the bottom of the prilling zone will be at the desired temperature.

The solid prills are removed from the bottom of the prilling zone at a temperature above the monoclinic critical temperature, usually between 84.2 and 100° C. and are conveyed to a predrying zone 8 via conveyor 7. The moisture content of the prills is dropped from approximately 3–5 percent to approximately 2–3 percent in the predrying zone. The prills are then passed to a final drying zone 9 where the moisture content is lowered to the desired level and preferably to less than 0.5 percent. It is within the scope of my invention to recirculate a portion of the dried material to either the predrying or to the final drying zone if desired. The dried prills are then passed to cooling zone 10. The cooled prills are conveyed to hopper 11 where a parting agent is added via conduit 12. These materials are then passed to tumbler 13 where the ammonium nitrate prills are thoroughly coated with the parting agent. The coated material is conveyed to storage or to a bagging machine via conduit 14. It is within the scope of my invention to screen the cooled prills and to return the over and under sized particles to the concentration zone not shown.

The above discussion is of one emodiment of my invention and does not limit it in any sense. Many modifications can be made without departing from the scope of this invention as will be obvious to those skilled in the art. For example, all of the drying can be done in one zone rather than two.

I will illustrate my invention by the following working examples but my invention is not limited to the conditions shown, but is applicable to the range of conditions herein disclosed.

A concentrated solution (approximately 95 percent) of ammonium nitrate was sprayed into the top of a prilling tower at 144° C. The droplets were allowed to fall counter-current to an ascending flow of air. The rate of flow and the temperature of the air were so adjusted that the temperature of the prills at the bottom of the tower was 88° C. The prills were dried, cooled and mixed with clay as a parting agent.

Other plant conditions were as follows:

78° C. inlet prill temperature to pre-dryer
Pre-dryer air inlet temperature=65° C.
Pre-dryer air outlet temperature=57° C.
Dryer inlet air temperature=130° C.
Dryer exit air temperature=75° C.
Cooler inlet air temperature=23° C.
Cooler outlet air temperature=46° C.

The following samples were collected over a 5 hour period:

|  | Sample 1 | Sample 2 | Sample 3 |
| --- | --- | --- | --- |
| Wt. Percent H₂O | 0.34 | 0.34 | 0.38 |
| Wt. Percent Clay [1] | 2.8 | 2.8 | 2.9 |
| Wt. Percent N | 33.9 | 33.9 | 33.8 |
| Percent Ret. No. 8 Screen | 2 | 4 | 2 |
| Percent Ret. No. 14 Screen | 79 | 73 | 65 |
| Percent Ret. No. 20 Screen | 95 | 96 | 93 |
| Percent Ret. No. 25 Screen | 97 | 98 | 96 |
| Percent Ret. No. 35 Screen | 98 | 99 | 98 |

[1] As a parting agent.

With the exception of the percent clay, the above results are typical of prills produced at both low and high temperatures. It was found that the high temperature prills would hold only about 3 percent clay while the low temperature prills will readily take on 5 to 6 percent clay or parting agent.

The material from the above was given the standard caking test where the material is pressed at a given pressure for a given time under standard tempearture and humidity conditions. The cake thus formed is broken and the required pressure is measured. The results of these tests were as follows:

Required pressure pounds per square inch
Sample 1 _____ 9
Sample 2 _____ 24
Sample 3 _____ 19

The average of 17 pounds for the above material compares with 45 to 90 pounds for normally produced low temperature prills.

These high temperature prills were solid and had a smooth, pearly, and lustrous surface. They were tough, being difficult to break by rolling with finger pressure a hard surface. The low temperature prills, on the other hand, have a somewhat porous and dull appearance and are more easily fractured when rolled with finger pressure across a hard surface.

A sample of prills produced by the method of my invention and wherein prilling temperature (temperature at bottom of prilling tower) was 93° C. was taken over a four hour period, bagged and stored ten bags in a layer and stacked 9 layers high. The initial storage moisture content was 0.35 percent. After 3 months the moisture content was 0.52 percent and there was very little sign of caking, the prills had retained their identity and had not broken down into fine particles.

Although I have described my invention in one of its preferred embodiments, it should be understood that my invention is not to be limited thereby. Many modifications will appear to those skilled in the art. I have not described the process in detail, for only the prilling conditions are new and novel. One skilled in the art, having been given the operative temperature range, will readily see many ways to make use of this invention.

I claim:

1. In the method of producing ammonium nitrate prills by spraying a molten aqueous solution of ammonium nitrate of at least 94 percent concentration into the top of a prilling zone having a gaseous cooling medium ascending therein and allowing resulting droplets to gravitate therethrough, the improvement comprising controlling the rate of flow and temperature of said gaseous cooling medium passing through said prilling zone so that molten ammonium nitrate concentrate droplets sprayed into the top of said prilling zone will be cooled to a temperature in the range above the monoclinic critical temperature and not higher than 100° C. during the period said droplets are gravitating to the bottom of said prilling zone and removing the resulting prills from said prilling zone while still above said monoclinic critical temperature and containing moisture in the range of 2–3 percent.

2. A process for the production of ammonium nitrate prills which comprises spraying aqueous ammonium nitrate solution at a temperature above its melting point and of at least 94 percent concentration into a prilling zone thereby breaking the ammonium nitrate up into droplets, gravitating said droplets through an ascending stream of air to the bottom of said prilling zone, cooling said droplets to a temperature below the solidification temperature but above the monoclinic critical temperature during the gravitating period and thereby forming prills, withdrawing said prills from said prilling zone at substantially the said second temperature while still containing moisture in the range of 2 to 3 weight percent, drying said prills and cooling said prills.

3. In the process of claim 2 the first said temperature being in the range of 130° to 150° C. and the second said temperature being in the range above the monoclinic critical temperature and not higher than 100° C.

4. A process for the production of ammonium nitrate prills which comprises spraying molten ammonium nitrate solution at a concentration of at least 94 percent and at a temperature at which said ammonium nitrate flows freely into the upper portion of a prilling zone thereby breaking ammonium nitrate up into droplets, gravitating said droplets to the bottom of said prilling zone, admitting air into the lower portion of said prilling zone, and sending said air upward and countercurrent to the gravitating droplets, regulating the flow and temperature of said air so that it will cool the gravitating droplets to a temperature above the monoclinic critical temperature of said ammonium nitrate solution but below the solidification temperature during the gravitating period thereby forming prills, removing said prills while still containing moisture in the range of 2 to 3 weight percent from said prilling zone at a temperature substantially the same as the said second temperature, and drying and cooling said prills.

5. In the process of claim 4 the first said temperature being in the range of 140 to 145° C. and the second said temperature being in the range of 87 and 93° C.

6. In the method of producing ammonium nitrate prills wherein a molten ammonium nitrate solution containing not more than 6 percent moisture is prilled by spraying said molten ammonium nitrate solution into the top of a tower, forming droplets, gravitating resulting droplets through an ascending stream of air and cooling said ammonium nitrate thereby forming solidified spheres as said ammonium nitrate solution gravitates the improvement comprising maintaining the gravitating spheres above the monoclinic temperature but below the solidification temperature and collecting and removing the resulting spheres at the bottom of said tower in the absence of complete drying and at a temperature above the monoclinic critical temperature.

7. In the method of claim 6 the gravitating spheres being cooled to a temperature within the range of 87 to 93° C.

8. In the process of producing ammonium nitrate by spraying molten aqueous ammonium nitrate containing not more than 6 percent moisture into the top of an elongated vertical prilling zone thereby forming droplets, gravitating said droplets through an ascending stream of air in said prilling zone, and cooling said droplets below the solidification temperature of said ammonium nitrate, the improvements comprising maintaining said gravitating droplets above the critical monoclinic temperature and removing the resulting prills from said prilling zone while still containing at least 2 percent moisture at a temperature above said critical monoclinic temperature.

References Cited in the file of this patent

UNITED STATES PATENTS

| | | |
|---|---|---|
| 1,131,361 | Gallup | Mar. 9, 1915 |
| 2,115,851 | Handforth et al. | May 3, 1938 |
| 2,402,192 | Williams et al. | June 18, 1946 |
| 2,528,407 | Yeandle | Oct. 31, 1950 |

FOREIGN PATENTS

| | | |
|---|---|---|
| 247,228 | Great Britain | Apr. 7, 1927 |